US012203753B2

United States Patent
Wang et al.

(10) Patent No.: US 12,203,753 B2
(45) Date of Patent: Jan. 21, 2025

(54) AUTOMATIC IDENTIFICATION METHOD AND DEVICE FOR PLANETARY SEISMOGRAPH AZIMUTH ANGLES BASED ON PLANETARY SUNDIAL

(71) Applicant: INSTITUTE OF GEOLOGY AND GEOPHYSICS, CHINESE ACADEMY OF SCIENCES, Beijing (CN)

(72) Inventors: Juan Wang, Beijing (CN); Jinhai Zhang, Beijing (CN); Shengquan Zhang, Beijing (CN); Shaoqing Li, Beijing (CN); Qingyu You, Beijing (CN)

(73) Assignee: INSTITUTE OF GEOLOGY AND GEOPHYSICS, THE CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 18/395,891

(22) Filed: Dec. 26, 2023

(65) Prior Publication Data

US 2024/0426606 A1   Dec. 26, 2024

(30) Foreign Application Priority Data

Jun. 20, 2023   (CN) .......................... 202310728198.4

(51) Int. Cl.
*G01C 1/00* (2006.01)
*G04B 49/02* (2006.01)
(52) U.S. Cl.
CPC ............... *G01C 1/00* (2013.01); *G04B 49/02* (2013.01)
(58) Field of Classification Search
None
See application file for complete search history.

(56) References Cited

U.S. PATENT DOCUMENTS

| 6,308,427 B1 | 10/2001 | Kaufmann |  |
|---|---|---|---|
| 2005/0120570 A1* | 6/2005 | Bastian | G01C 17/34 33/268 |
| 2007/0117078 A1* | 5/2007 | Bruns | G09B 27/00 434/284 |

FOREIGN PATENT DOCUMENTS

| CN | 1576885 A | 2/2005 |
| CN | 101373137 A | 2/2009 |

(Continued)

OTHER PUBLICATIONS

Xianhua Li, Computation of Solar Elevations and Azimuths at Pixels of Satellite Image, Acta Geodaetica et Cartographica Sinica, vol. 22, No. 2, issued date May 1993.

*Primary Examiner* — Lina Cordero
(74) *Attorney, Agent, or Firm* — Daniel M. Cohn; Howard M. Cohn

(57) ABSTRACT

The present invention discloses an automatic identification method and device for planetary seismograph azimuth angles based on a planetary sundial, comprising: obtaining geographical coordinates of a sundial needle tip and a sundial needle tip shadow relative to a planetary surface; determining a theoretical second solar ray elevation angle and a ray azimuth angle; constructing an objective function according to a first solar ray elevation angle and a ray azimuth angle corresponding to a time for obtaining the sundial needle tip shadow; and taking a minimum objective function as a target for solving a planetary seismograph azimuth angle. The present invention determines the planetary seismograph azimuth angle only by optical photos of a planetary rover or a lander without active vibration devices on supporting legs of the lander, thereby reducing system complexity and reducing weight, volume and power consumption brought by additional devices on the supporting legs of the lander.

7 Claims, 4 Drawing Sheets

(56) References Cited

FOREIGN PATENT DOCUMENTS

| | | | |
|---|---|---|---|
| CN | 101493322 | A | 7/2009 |
| CN | 102183967 | A | 9/2011 |
| CN | 103425850 | A | 12/2013 |
| CN | 107677237 | A | 2/2018 |
| CN | 116164699 | A | 5/2023 |
| DE | 102006004498 | A1 | 8/2007 |
| EP | 3311201 | B1 | 2/2020 |
| FR | 2515812 | A1 | 5/1983 |
| JP | 2003066166 | A | 3/2003 |

* cited by examiner

AUTOMATIC IDENTIFICATION METHOD AND DEVICE FOR PLANETARY SEISMOGRAPH AZIMUTH ANGLES BASED ON PLANETARY SUNDIAL

TECHNICAL FIELD

The present invention relates to the technical field of planetary exploration technologies, more particularly to an automatic identification method and device for planetary seismograph azimuth angles based on a planetary sundial.

BACKGROUND

The layout of a planetary seismograph is the most effective means to explore the internal planetary structure and the planetary underground resources. The layout of the planetary seismograph includes unmanned layout and manned layout. Either layout mode faces the attitude change of the instrument caused by vibration, disturbance or uneven settlement after the arrangement of the instrument, and this change needs to be sensed by a method in time to ensure the accuracy and application effects of the observation data of the planetary seismograph.

At present, the orientation of the planetary seismograph is mainly explored based on an active source. The specific exploration method refers to the Chinese patent with patent No. 202310458339.5 and title of an automatic identification method for active source azimuth angles of a planetary seismograph.

Although this method can realize the automatic identification of azimuth angles without human participation, a vibration excitation device is arranged on each supporting leg of the planetary seismograph, which undoubtedly increases the complexity of the system structure and increases the weight, volume and power consumption of the exploration device.

SUMMARY

In view of this, the present invention innovatively proposes an automatic identification method and device for planetary seismograph azimuth angles based on a planetary sundial, intended to realize the automatic identification of the planetary seismograph azimuth angles without increasing the extra weight of the exploration device.

In order to achieve the above purpose, the present invention adopts the following technical solution:

On the one hand, the present invention discloses an automatic identification method for planetary seismograph azimuth angles based on a planetary sundial, comprising:

obtaining a geographical coordinate of a sundial needle tip relative to a planetary surface;

obtaining an overlooking image of a sundial needle shadow on a surface of a planetary seismograph, and a first solar ray elevation angle and a ray azimuth angle at a same time;

obtaining a geographical coordinate of a sundial needle tip shadow relative to the planetary surface according to the overlooking image;

determining a theoretical second solar ray elevation angle and a ray azimuth angle according to the geographical coordinate of the sundial needle tip relative to the planetary surface and the geographical coordinate of the sundial needle tip shadow relative to the planetary surface;

constructing an objective function based on the first solar ray elevation angle and the ray azimuth angle, and the second solar ray elevation angle and the ray azimuth angle;

solving by taking a minimum objective function as a target to obtain a planetary seismograph azimuth angle.

Preferably, the geographical coordinate of the sundial needle tip relative to the planetary surface is $Q_{0N}(X_{0N}, Y_{0N}, Z_{0N})$, and an expression is as follows:

$$\begin{bmatrix} X_{0N} \\ Y_{0N} \\ Z_{0N} \end{bmatrix} = \begin{bmatrix} \cos\theta1\cos\Delta\alpha - \sin\theta1\sin\theta2\sin\Delta\alpha & -\sin\theta1\cos\theta2 & \cos\theta1\sin\Delta\alpha + \sin\theta1\sin\theta2\cos\Delta\alpha \\ \sin\theta1\cos\Delta\alpha + \cos\theta1\sin\theta2\sin\Delta\alpha & \cos\theta1\cos\theta2 & \sin\theta1\sin\Delta\alpha - \cos\theta1\sin\theta2\cos\Delta\alpha \\ -\cos\theta2\sin\Delta\alpha & \sin\theta2 & \cos\theta2\cos\Delta\alpha \end{bmatrix} \begin{bmatrix} 0 \\ 0 \\ H \end{bmatrix}$$

In the formula, $\theta1$ is a pitch angle after the planetary seismograph is arranged on the planetary surface, $\theta2$ is a rolling angle after the planetary seismograph is arranged on the planetary surface, $\Delta\alpha$ is an azimuth angle of the planetary seismograph, and H is a length of a sundial needle.

Preferably, the overlooking image of the sundial needle shadow is obtained by photographing by a rover camera or a lander camera.

Preferably, the first solar ray elevation angle and the ray azimuth angle at the same time are obtained according to the following formulas;

$$\cos Az \cos h = \cos H \cos \delta \sin \phi - \sin \delta \cos \phi$$

$$\sin Az \cos h = \sin H \cos \delta$$

$$\sin h = \sin \delta \sin \phi + \cos H \cos \delta \cos \phi$$

In the formula, $\delta$ is a solar declination, H is a solar hour angle, and $\phi$ is a geographical latitude of the planetary seismograph layout.

Preferably, the geographical coordinate of the sundial needle tip shadow relative to the planetary surface is $Q_{1N}(X_{1N}, Y_{1N}, Z_{1N})$, and a calculation formula is as follows:

$$\begin{bmatrix} X_{1N} \\ Y_{1N} \\ Z_{1N} \end{bmatrix} = \begin{bmatrix} \cos\theta1\cos\Delta\alpha - \sin\theta1\sin\theta2\sin\Delta\alpha & -\sin\theta1\cos\theta2 & \cos\theta1\sin\Delta\alpha + \sin\theta1\sin\theta2\cos\Delta\alpha \\ \sin\theta1\cos\Delta\alpha + \cos\theta1\sin\theta2\sin\Delta\alpha & \cos\theta1\cos\theta2 & \sin\theta1\sin\Delta\alpha - \cos\theta1\sin\theta2\cos\Delta\alpha \\ -\cos\theta2\sin\Delta\alpha & \sin\theta2 & \cos\theta2\cos\Delta\alpha \end{bmatrix} \begin{bmatrix} X_{1B} \\ Y_{1B} \\ Z_{1B} \end{bmatrix}$$

In the formula, $\theta1$ is a pitch angle after the planetary seismograph is arranged on the planetary surface; $\theta2$ is a rolling angle after the planetary seismograph is arranged on the planetary surface; $\Delta\alpha$ is an azimuth angle of the planetary seismograph; and $(X_{1B}, Y_{1B}, Z_{1B})$ is a coordinate of the sundial needle tip shadow in a coordinate system of the planetary seismograph.

Preferably, $(X_{1B}, Y_{1B}, Z_{1B})$ is obtained by the following formulas:

$$X_{1B} = kx * X_{1P}$$

$$Y_{1B} = ky * Y_{1P}$$

$$Z_{1B} = Z_{1P} = 0$$

In the formulas, $(X_{1P}, Y_{1P}, Z_{1P})$ is the coordinate of the sundial needle tip shadow in the overlooking image, kx is a scaling ratio of a sundial surface pattern in a transverse axis direction of the overlooking image, and ky is a scaling ratio of the sundial surface pattern in a vertical axis direction of the overlooking image.

Preferably, the second solar ray elevation angle and the ray azimuth angle are obtained by the following formulas:

$$\alpha' = \arctan\frac{\Delta Y}{\Delta X}$$

$$\beta' = \arctan\frac{\Delta Z}{\sqrt{\Delta X^2 + \Delta Y^2}}$$

wherein $\Delta X = X_{1N} - X_{0N}$, $\Delta Y = Y_{1N} - Y_{0N}$, $\Delta Z = Z_{1N} - Z_{0N}$; $Q_{0N}(X_{0N}, Y_{0N}, Z_{0N})$ is a geographical coordinate of the sundial needle tip relative to the planetary surface; and $Q_{1N}(X_{1N}, Y_{1N}, Z_{1N})$ is a geographical coordinate of the sundial needle tip shadow relative to the planetary surface.

Preferably, the objective function is:

$$A = |\alpha - \alpha'| + |\beta - \beta'|$$

In the formula, $\alpha$ and $\beta$ are the first solar ray azimuth angle and the ray elevation angle; and $\alpha'$ and $\beta'$ are the second solar ray azimuth angle and the ray elevation angle.

On the other hand, the present invention discloses an automatic identification device for planetary seismograph azimuth angles based on a planetary sundial, comprising:
- a geographical coordinate acquisition unit of a sundial needle tip, used for obtaining the geographical coordinate of the sundial needle tip relative to the planetary surface according to a pitch angle, a rolling angle and an azimuth angle after the planetary seismograph is arranged on the planetary surface;
- a geographical coordinate acquisition unit of a sundial needle tip shadow, used for receiving and obtaining the geographical coordinate of the sundial needle tip shadow relative to the planetary surface according to the overlooking image of the needle tip shadow, and the pitch angle, the rolling angle and the azimuth angle after the planetary seismograph is arranged on the planetary surface;
- an azimuth angle identification unit of the planetary seismograph, used for determining the solar ray elevation angle and the ray azimuth angle when the overlooking image is obtained, constructing an objective function by combining the geographical coordinate of the sundial needle tip relative to the planetary surface and the geographical coordinate of the sundial needle tip shadow relative to the planetary surface, and performing solving to obtain a planetary seismograph azimuth angle.

According to the above technical solution, compared with the prior art, the present invention discloses and provides an automatic identification method and device for planetary seismograph azimuth angles based on a planetary sundial. The coordinate of the sundial tip shadow relative to the planetary surface is obtained through a sundial shadow image; the objective function is constructed by combining the coordinate of the sundial tip relative to the planetary surface and the solar elevation angle and the azimuth angle when the sundial shadow image is obtained; and further, the azimuth angle of the planetary seismograph is obtained by solving the objective function. The azimuth angle identification method and device disclosed by the present invention have the following beneficial effects:

1. Compared with an exploration method of an active source, the planetary seismograph azimuth angle can be determined only by optical photos of a planetary rover or a lander without an active vibration device on supporting legs of the lander, thereby reducing the complexity of the system and reducing the weight, volume and power consumption brought by additional devices on the supporting legs of the lander;
2. Through the shadow image of the planetary sundial and the calculation mode disclosed by the present invention, the azimuth angle of the planetary seismograph can be obtained automatically, quickly and efficiently without waiting for natural planetary seismic signals, so as to provide a basis for the analysis and processing of subsequent natural planetary seismic signals.

Other features and advantages of the present invention will be illustrated in the following description, and parts will become apparent from the description, or will be known through the implementation of the present invention. The purpose and other advantages of the present invention can be realized and obtained through the structures specially pointed out in the written description, claims and drawings.

The technical solution of the present invention is further described in detail below by the drawings and embodiments.

DESCRIPTION OF DRAWINGS

To more clearly describe the technical solutions in the embodiments of the present invention or in the prior art, the drawings required to be used in the description of the embodiments or the prior art will be simply presented below. Apparently, the drawings in the following description are merely the embodiments of the present invention, and for those ordinary skilled in the art, other drawings can also be obtained according to the provided drawings without contributing creative labor.

DETAILED DESCRIPTION

The technical solutions in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

In the field of azimuth angle sensing of the planetary seismograph, there is only one method of azimuth angle identification based on an active source, and the inventor is the same as that of the present application. Although this solution achieves accurate identification of the azimuth angle, additional weight and power consumption are obviously added, which complicates the structure of the planetary seismograph.

Therefore, the inventor of the present application continues to carry out in-depth research, and innovatively proposes an automatic identification method and device for planetary seismograph azimuth angles based on a planetary sundial again to overcome the technical defects revealed in the previous patent.

The azimuth angle identification method disclosed by the present invention can achieve the automatic identification of the planetary seismograph azimuth angle only through the optical photos and a ground inclination and coordinate parameters of a lander point without adding other devices on the planetary seismograph.

Embodiment 1

Figure 1:
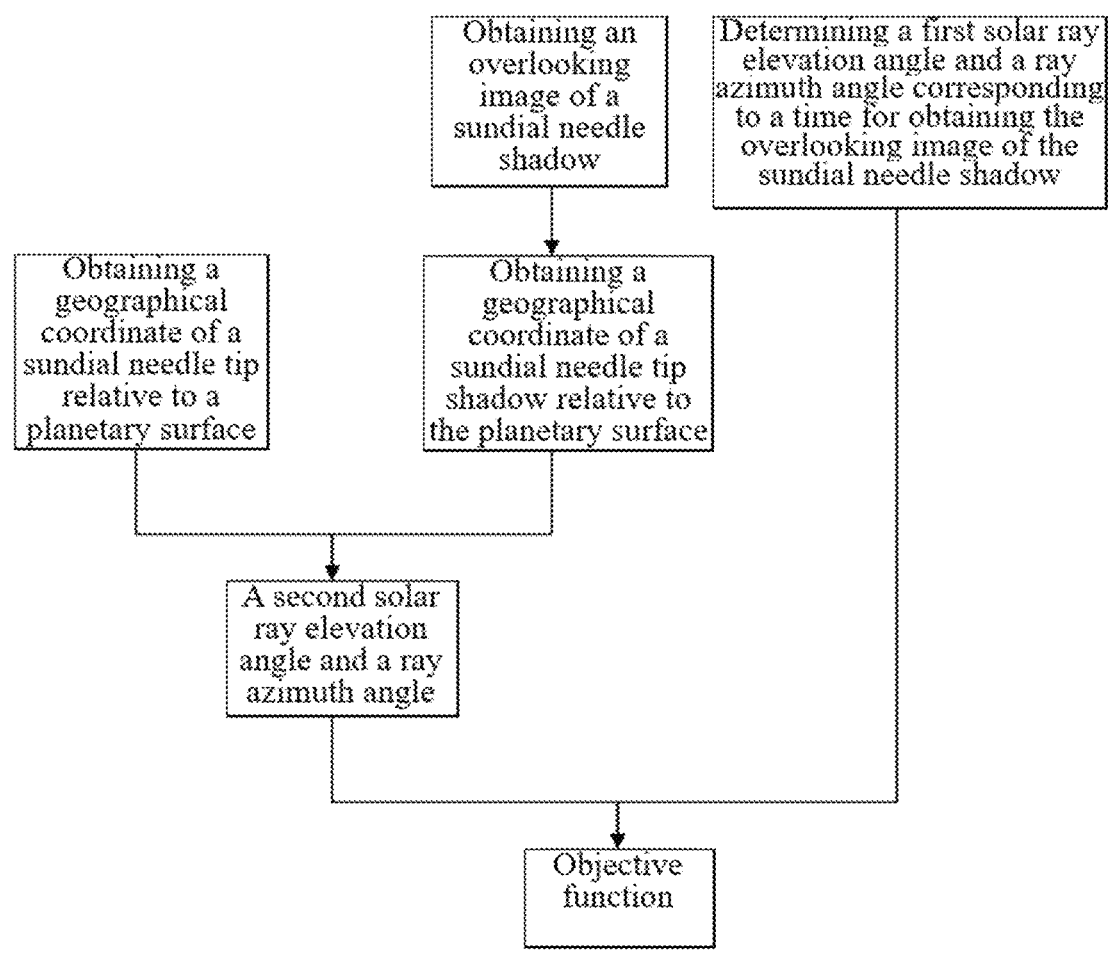
FIG. 1 is a principle diagram of an automatic identification method for planetary seismograph azimuth angles based on a planetary sundial in the present invention.

Specifically, the present invention comprises the following steps, as shown in FIG. 1:
obtaining a geographical coordinate of a sundial needle tip relative to a planetary surface;
obtaining an overlooking image of a sundial needle shadow on a surface of a planetary seismograph, and a first solar ray elevation angle and a ray azimuth angle at a same time;
obtaining a geographical coordinate of a sundial needle tip shadow relative to the planetary surface according to the overlooking image;
determining a theoretical second solar ray elevation angle and a ray azimuth angle according to the geographical coordinate of the sundial needle tip relative to the planetary surface and the geographical coordinate of the sundial needle tip shadow relative to the planetary surface;
constructing an objective function based on the first solar ray elevation angle and the ray azimuth angle, and the second solar ray elevation angle and the ray azimuth angle;
solving by taking a minimum objective function as a target to obtain a planetary seismograph azimuth angle.

The present invention firstly obtains the overlooking image of the sundial needle shadow, and then calculates the azimuth angle of the planetary seismograph on the planetary surface through the attitude information of the planetary seismograph and the relative position relationship between the sun and the planet. That is, the azimuth angle of the planetary seismograph can be obtained automatically, quickly and efficiently through the shadow image and the calculation mode of the planetary sundial without waiting for the natural planetary seismic signals, thereby providing a basis for the analysis and processing of the subsequent natural planetary seismic signals.

In order to make those skilled in the art understand the implementation process of the solution of the present invention, the structure of the planetary seismograph is explained at first.

Embodiment 2

Figure 2:
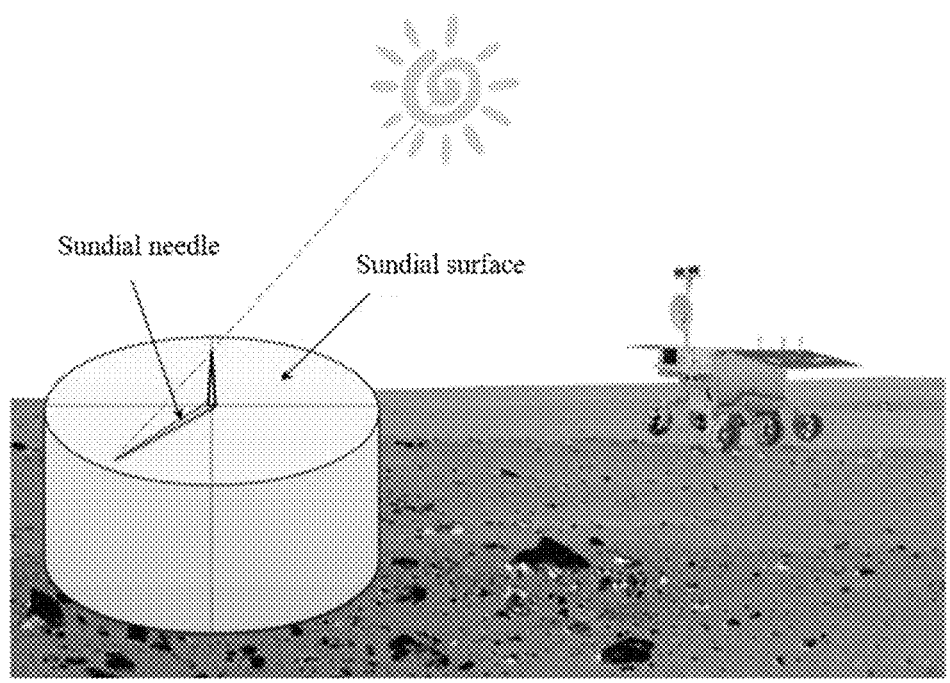
FIG. 2 is a schematic diagram of a planetary seismograph and a planetary rover arranged on a planetary surface in the present invention.

As shown in FIG. 2, an upper surface of the planetary seismograph is mainly composed of a sundial needle and a sundial surface, and the sundial needle can produce shadows under the irradiation of sunlight.

Figure 3:
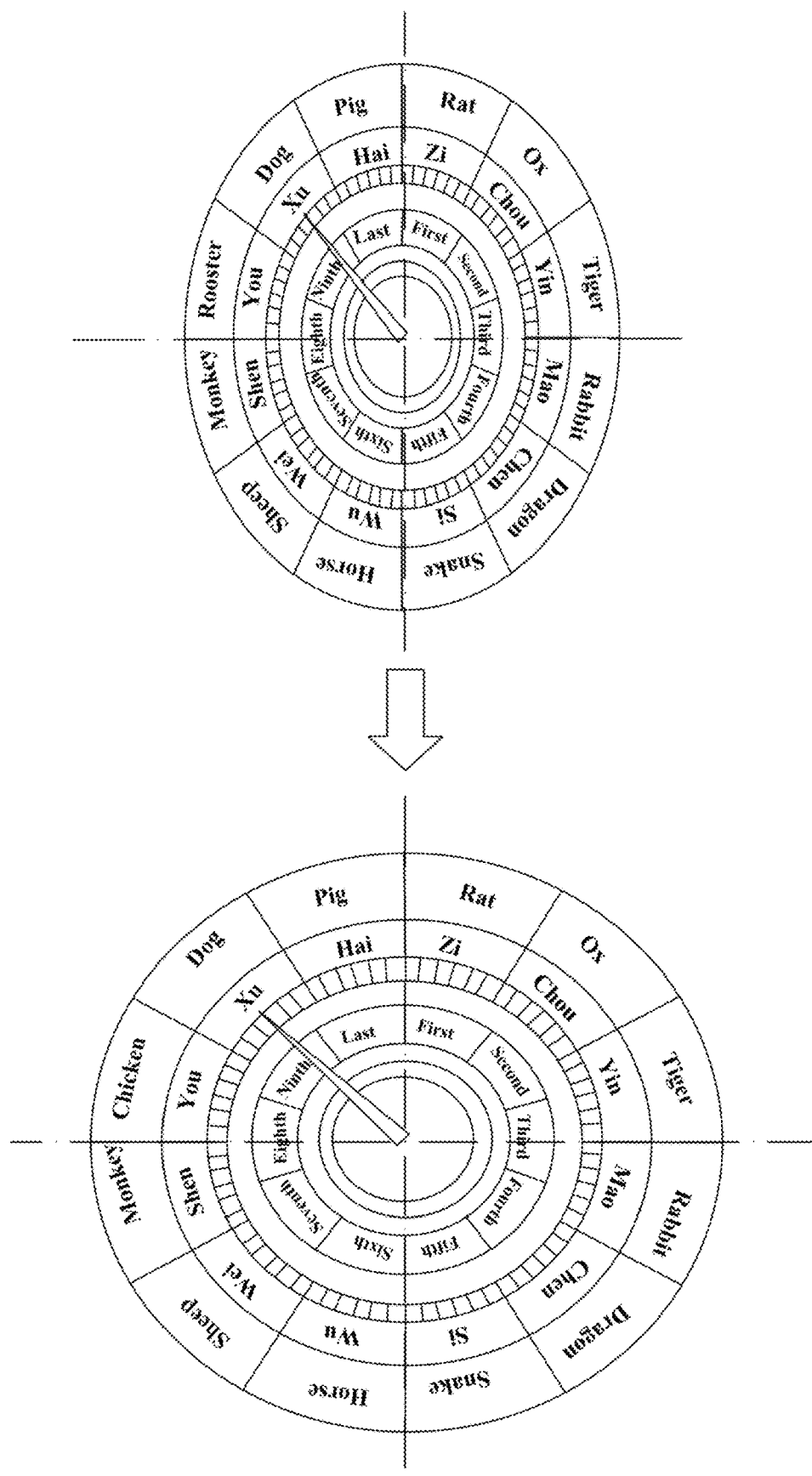
FIG. 3 shows a sundial surface, a sundial needle and a shadow top view in the present invention.

In the present embodiment, in order to distinguish shadow angles generated by the sundial needle conveniently, several different regions are divided in different directions of the sundial surface, as shown in FIG. 3. A left side is a photo, and a right side is a converted top view.

In the identification process of the azimuth angle,

Firstly, the geographical coordinate of the sundial needle tip relative to the planetary surface is $Q_{ON}(X_{ON}, Y_{ON}, Z_{ON})$. If the length of the sundial needle is H, the coordinate of the sundial needle in a planetary seismograph coordinate system is $Q_{OB}(0,0,H)$. The geographical coordinate of the sundial needle on the planetary surface is calculated as $Q_{ON}(X_{ON}, Y_{ON}, Z_{ON}) = C^* Q_{OB}$ according to an Euler angle transformation coordinate matrix $(\Delta\alpha, \theta1, \theta2)$. C is a rotation matrix, $\theta1$ (angle with NS) and $\theta2$ (angle with EW) are a pitch angle and a rolling angle obtained from an attitude sensor in the planetary seismograph after the planetary seismograph is arranged on the planetary surface, and $\Delta\alpha$ is an azimuth angle of the planetary seismograph.

An expression is as follows:

$$\begin{bmatrix} X_{ON} \\ Y_{ON} \\ Z_{ON} \end{bmatrix} = \begin{bmatrix} \cos\theta1\cos\Delta\alpha - \sin\theta1\sin\theta2\sin\Delta\alpha & -\sin\theta1\cos\theta2 & \cos\theta1\sin\Delta\alpha + \sin\theta1\sin\theta2\cos\Delta\alpha \\ \sin\theta1\cos\Delta\alpha + \cos\theta1\sin\theta2\sin\Delta\alpha & \cos\theta1\cos\theta2 & \sin\theta1\sin\Delta\alpha - \cos\theta1\sin\theta2\cos\Delta\alpha \\ -\cos\theta2\sin\Delta\alpha & \sin\theta2 & \cos\theta2\cos\Delta\alpha \end{bmatrix} \begin{bmatrix} 0 \\ 0 \\ H \end{bmatrix}$$

Figure 4:
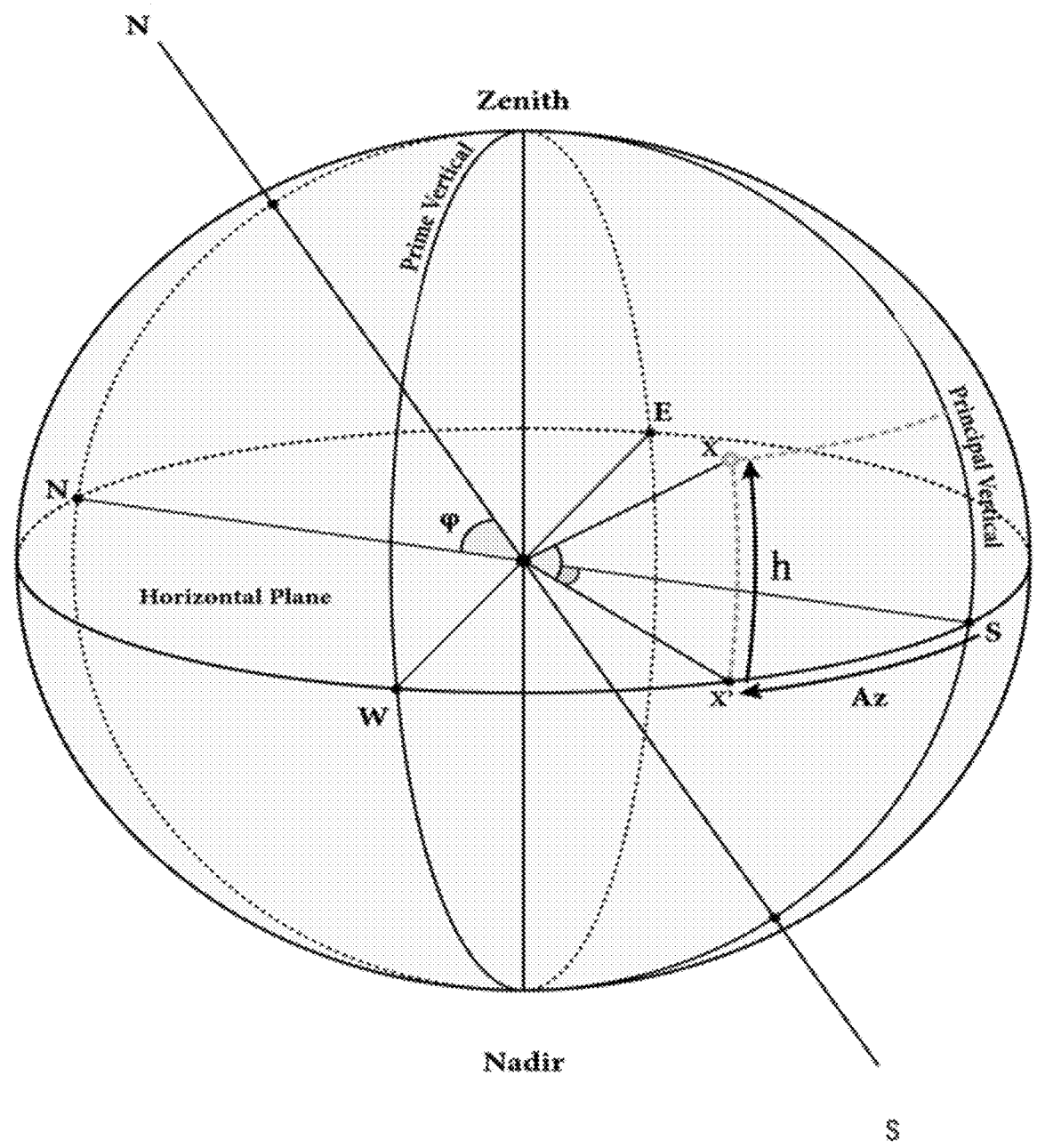
FIG. 4 is a schematic diagram of a solar elevation angle and a ray azimuth angle in the present invention.

Secondly, the overlooking image of the sundial needle shadow on the surface of the planetary seismograph is obtained. In the present embodiment, the overlooking image of the sundial needle shadow is obtained by photographing by a rover camera or a lander camera. At the same time, a first solar ray elevation angle and a ray azimuth angle at the same time are obtained. The solar elevation angle refers to an angle between a spatial direction vector pointing towards the sun at a point on the surface of the planet at a moment and the horizontal plane of the planet, which changes with time. As shown in FIG. 4, If h is the elevation angle and Az is the azimuth angle, then the solar elevation angle h and the azimuth angle Az are calculated by the following formulas:

$\cos Az \cos h = \cos H \cos \delta \sin \phi - \sin \delta \cos \phi$ $\sin Az \cos h = \sin H \cos \delta$ $\sin h = \sin \delta \sin \phi + \cos H \cos \delta \cos \phi$ In the formulas, δ is a solar declination; H is a solar hour angle, which is obtained by an ephemeris; and φ is a geographical latitude arranged by the planetary seismograph, which can be obtained by flight data.

The geographical coordinate of the sundial needle tip shadow relative to the planetary surface is set as $Q_{1N}(X_{1N}, Y_{1N}, Z_{1N})$. The geographical coordinate of the sundial needle tip shadow $Q_{1B}$ on the planetary surface is calculated as $Q_{1N}(X_{1N}, Y_{1N}, Z_{1N}) = C^*Q_{1B}$ according to the Euler angle transformation coordinate matrix ($\Delta\alpha$, θ1, θ2), and C is a rotation matrix.

A calculation formula is:

$$\begin{bmatrix} X_{1N} \\ Y_{1N} \\ Z_{1N} \end{bmatrix} = \begin{bmatrix} \cos\theta1\cos\Delta\alpha - \sin\theta1\sin\theta2\sin\Delta\alpha & -\sin\theta1\cos\theta2 & \cos\theta1\sin\Delta\alpha + \sin\theta1\sin\theta2\cos\Delta\alpha \\ \sin\theta1\cos\Delta\alpha + \cos\theta1\sin\theta2\sin\Delta\alpha & \cos\theta1\cos\theta2 & \sin\theta1\sin\Delta\alpha - \cos\theta1\sin\theta2\cos\Delta\alpha \\ -\cos\theta2\sin\Delta\alpha & \sin\theta2 & \cos\theta2\cos\Delta\alpha \end{bmatrix} \begin{bmatrix} X_{1B} \\ Y_{1B} \\ Z_{1B} \end{bmatrix}$$

In the formula, θ1 is a pitch angle after the planetary seismograph is arranged on the planetary surface; θ2 is a rolling angle after the planetary seismograph is arranged on the planetary surface; $\Delta\alpha$ is an azimuth angle of the planetary seismograph; and $(X_{1B}, Y_{1B}, Z_{1B})$ is a coordinate of the sundial needle tip shadow in a coordinate system of the planetary seismograph.

Wherein $(X_{1B}, Y_{1B}, Z_{1B})$ is obtained by the following formulas:

$X_{1B} = kx^*X_{1P}$ $Y_{1B} = ky^*Y_{1P}$ $Z_{1B} = Z_{1P} = 0$

In the formulas, $(X_{1P}, Y_{1P}, Z_{1P})$ is the coordinate of the sundial needle tip shadow in the overlooking image, kx is a scaling ratio of a sundial surface pattern in a transverse axis direction of the overlooking image, and ky is a scaling ratio of the sundial surface pattern in a vertical axis direction of the overlooking image.

Further, the second solar ray elevation angle and the ray azimuth angle are obtained by the following formulas:

$$\alpha' = \arctan\frac{\Delta Y}{\Delta X}$$

$$\beta' = \arctan\frac{\Delta Z}{\sqrt{\Delta X^2 + \Delta Y^2}}$$

wherein $\Delta X = X_{1N} - X_{0N}$, $\Delta Y = Y_{1N} - Y_{0N}$, $\Delta Z = Z_{1N} - Z_{0N}$; $Q_{0N}(X_{0N}, Y_{0N}, Z_{0N})$ is a geographical coordinate of the sundial needle tip relative to the planetary surface; and $Q_{1N}(X_{1N}, Y_{1N}, Z_{1N})$ is a geographical coordinate of the sundial needle tip shadow relative to the planetary surface.

In the present embodiment, based on the first solar ray elevation angle and the ray azimuth angle and the second solar ray elevation angle and the ray azimuth angle, the constructed objective function is:

$$A = |\alpha - \alpha'| + |\beta - \beta'|$$

In the formula, α and β are the first solar ray azimuth angle and the ray elevation angle; and α' and β' are the second solar ray azimuth angle and the ray elevation angle.

A minimum objective function is taken as a target for solving to obtain the azimuth angle of the planetary seismograph. In the present embodiment, when solving, Aa varies from 1 to 360° at an interval of 1°.

Embodiment 3

The present embodiment further discloses an automatic identification device for planetary seismograph azimuth angles based on a planetary sundial, comprising:

a geographical coordinate acquisition unit of a sundial needle tip, used for obtaining the geographical coordinate of the sundial needle tip relative to the planetary surface according to a pitch angle, a rolling angle and an azimuth angle after the planetary seismograph is arranged on the planetary surface;

a geographical coordinate acquisition unit of a sundial needle tip shadow, used for receiving and obtaining the geographical coordinate of the sundial needle tip shadow relative to the planetary surface according to the overlooking image of the needle tip shadow, and the pitch angle, the rolling angle and the azimuth angle after the planetary seismograph is arranged on the planetary surface;

an azimuth angle identification unit of the planetary seismograph, used for determining the solar ray elevation angle and the ray azimuth angle when the overlooking image is obtained, constructing an objective function by combining the geographical coordinate of the sundial needle tip relative to the planetary surface and the geographical coordinate of the sundial needle tip shadow relative to the planetary surface, and performing solving to obtain a planetary seismograph azimuth angle.

Compared with the prior art, the automatic identification device or method of the azimuth angle disclosed by the present invention can determine the planetary seismograph azimuth angle only by optical photos of the planetary rover or the lander without an active vibration device on supporting legs of the lander, thereby reducing the complexity of the system and reducing the weight, volume and power consumption brought by additional devices on the supporting legs of the lander.

Each embodiment in the description is described in a progressive way. The difference of each embodiment from each other is the focus of explanation. The same and similar parts among all of the embodiments can be referred to each other. For a device disclosed by the embodiments, because the device corresponds to a method disclosed by the embodiments, the device is simply described. Refer to the description of the method part for the related part.

The above description of the disclosed embodiments enables those skilled in the art to realize or use the present invention. Many modifications to these embodiments will be apparent to those skilled in the art. The general principle defined herein can be realized in other embodiments without departing from the spirit or scope of the present invention. Therefore, the present invention will not be limited to these embodiments shown herein, but will conform to the widest scope consistent with the principle and novel features disclosed herein.

What is claimed is:

1. An automatic identification method for planetary seismograph azimuth angles based on a planetary sundial, comprising:
   obtaining a geographical coordinate of a sundial needle tip relative to a planetary surface by a ground station computer;
   obtaining an overlooking image of a sundial needle shadow by a rover camera or a lander camera, and obtaining a first solar ray elevation angle and a first solar ray azimuth angle by the ground station computer;
   obtaining a geographical coordinate of a sundial needle tip shadow relative to the planetary surface according to the overlooking image by the ground station computer;
   determining a theoretical second solar ray elevation angle and a second solar ray azimuth angle according to the geographical coordinate of the sundial needle tip relative to the planetary surface and the geographical coordinate of the sundial needle tip shadow relative to the planetary surface;
   constructing an objective function based on the first solar ray elevation angle and the first solar ray azimuth angle, and the second solar ray elevation angle and the second solar ray azimuth angle;
   the objective function defined as:

$$A = |\alpha - \alpha'| + |\beta - \beta'|$$

wherein, $\alpha$ and $\beta$ are the first solar ray azimuth angle and the first solar ray elevation angle; and $\alpha'$ and $\beta'$ are the second solar ray azimuth angle and the second solar ray elevation angle;
   solving the objective function by taking a minimum objective function as a target to obtain a planetary seismograph azimuth angle configured for a layout of a planetary seismograph to explore an internal planetary structure and planetary underground resources.

2. The automatic identification method for planetary seismograph azimuth angles based on the planetary sundial according to claim 1, wherein the geographical coordinate of the sundial needle tip relative to the planetary surface is $Q_{0N}(X_{0N}, Y_{0N}, Z_{0N})$, and an expression is as follows:

$$\begin{bmatrix} X_{0N} \\ Y_{0N} \\ Z_{0N} \end{bmatrix} = \begin{bmatrix} \cos\theta 1\cos\Delta\alpha - \sin\theta 1\sin\theta 2\sin\Delta\alpha & -\sin\theta 1\cos\theta 2 & \cos\theta 1\sin\Delta\alpha + \sin\theta 1\sin\theta 2\cos\Delta\alpha \\ \sin\theta 1\cos\Delta\alpha + \cos\theta 1\sin\theta 2\sin\Delta\alpha & \cos\theta 1\cos\theta 2 & \sin\theta 1\sin\Delta\alpha - \cos\theta 1\sin\theta 2\cos\Delta\alpha \\ -\cos\theta 2\sin\Delta\alpha & \sin\theta 2 & \cos\theta 2\cos\Delta\alpha \end{bmatrix} \begin{bmatrix} 0 \\ 0 \\ H \end{bmatrix}$$

wherein, $\theta 1$ is a pitch angle obtained by an attitude sensor after the planetary seismograph is arranged on the planetary surface, $\theta 2$ is a rolling angle obtained by the attitude sensor after the planetary seismograph is arranged on the planetary surface, Au is an azimuth angle of the planetary seismograph, and H is a length of a sundial needle.

3. The automatic identification method for planetary seismograph azimuth angles based on the planetary sundial according to claim 1, wherein the first solar ray elevation angle and the first solar ray azimuth angle at a same time are obtained according to the following formulas:

$\cos Az \cos h = \cos H \cos \delta \sin \phi - \sin \delta \cos \phi$ $\sin Az \cos h = \sin H \cos \delta$ $\sin h = \sin \delta \sin \phi + \cos H \cos \delta \cos \phi$ wherein, $\delta$ is a solar declination, H is a solar hour angle, and $\phi$ is a geographical latitude of the layout of the planetary seismograph.

4. The automatic identification method for planetary seismograph azimuth angles based on the planetary sundial according to claim 1, wherein the geographical coordinate of the sundial needle tip shadow relative to the planetary surface is $Q_{1N}(X_{1N}, Y_{1N}, Z_{1N})$, and a calculation formula is as follows:

$$\begin{bmatrix} X_{1N} \\ Y_{1N} \\ Z_{1N} \end{bmatrix} = \begin{bmatrix} \cos\theta 1\cos\Delta\alpha - \sin\theta 1\sin\theta 2\sin\Delta\alpha & -\sin\theta 1\cos\theta 2 & \cos\theta 1\sin\Delta\alpha + \sin\theta 1\sin\theta 2\cos\Delta\alpha \\ \sin\theta 1\cos\Delta\alpha + \cos\theta 1\sin\theta 2\sin\Delta\alpha & \cos\theta 1\cos\theta 2 & \sin\theta 1\sin\Delta\alpha - \cos\theta 1\sin\theta 2\cos\Delta\alpha \\ -\cos\theta 2\sin\Delta\alpha & \sin\theta 2 & \cos\theta 2\cos\Delta\alpha \end{bmatrix} \begin{bmatrix} X_{1B} \\ Y_{1B} \\ Z_{1B} \end{bmatrix}$$

wherein, $\theta 1$ is a pitch angle after the planetary seismograph is arranged on the planetary surface; $\theta 2$ is a rolling angle after the planetary seismograph is arranged on the planetary surface; $\Delta\alpha$ is an azimuth angle of the planetary seismograph; and $(X_{1B}, Y_{1B}, Z_{1B})$ is a coordinate of the sundial needle tip shadow in a coordinate system of the planetary seismograph.

5. The automatic identification method for planetary seismograph azimuth angles based on the planetary sundial according to claim 4, wherein $(X_{1B}, Y_{1B}, Z_{1B})$ IS obtained by the following formulas:

$X_{1B} = kx * X_{1P}$ $Y_{1B} = ky * Y_{1P}$ $Z_{1B} = Z_{1P} = 0$ wherein, $(X_{1P}, Y_{1P}, Z_{1P})$ is a coordinate of the sundial needle tip shadow in the overlooking image, kx is a scaling ratio of a sundial surface pattern in a transverse axis direction of the overlooking image, and ky is a scaling ratio of the sundial surface pattern in a vertical axis direction of the overlooking image.

6. The automatic identification method for planetary seismograph azimuth angles based on the planetary sundial according to claim 1, wherein the second solar ray elevation angle and the second solar ray azimuth angle are obtained by the following formulas:

$$\alpha' = \arctan\frac{\Delta Y}{\Delta X}$$

$$\beta' = \arctan\frac{\Delta Z}{\sqrt{\Delta X^2 + \Delta Y^2}}$$

wherein $\Delta X = X_{1N} - X_{0N}$, $\Delta Y = Y_{1N} - Y_{0N}$, $\Delta Z = Z_{1N} - Z_{0N}$; $Q_{0N}(X_{0N}, Y_{0N}, Z_{0N})$ is the geographical coordinate of the sundial needle tip relative to the planetary surface; and $Q_{1N}(X_{1N}, Y_{1N}, Z_{1N})$ is the geographical coordinate of the sundial needle tip shadow relative to the planetary surface.

7. An automatic identification device for planetary seismograph azimuth angles based on a planetary sundial, comprising:

a geographical coordinate acquisition device of a sundial needle tip, used for obtaining a geographical coordinate of the sundial needle tip relative to a planetary surface according to a pitch angle, a rolling angle and an azimuth angle after a planetary seismograph is arranged on the planetary surface;

a geographical coordinate acquisition device of a sundial needle tip shadow, used for receiving and obtaining a geographical coordinate of the sundial needle tip shadow relative to the planetary surface according to an overlooking image of the sundial needle tip shadow, and the pitch angle, the rolling angle and the azimuth angle after the planetary seismograph is arranged on the planetary surface;

an azimuth angle identification device of the planetary seismograph, used for determining a first solar ray elevation angle and a first solar ray azimuth angle when the overlooking image is obtained, constructing an objective function by combining the geographical coordinate of the sundial needle tip relative to the planetary surface and the geographical coordinate of the sundial needle tip shadow relative to the planetary surface, and solving the objective function to obtain a planetary seismograph azimuth angle; the objective function defined as:

$$A = |\alpha - \alpha'| + |\beta - \beta'|$$

wherein, $\alpha$ and $\beta$ are the first solar ray azimuth angle and the first solar ray elevation angle; and $\alpha'$ and $\beta'$ are a second solar ray azimuth angle and a second solar ray elevation angle.

\* \* \* \* \*